(12) United States Patent
Sasaki et al.

(10) Patent No.: US 7,832,255 B2
(45) Date of Patent: Nov. 16, 2010

(54) SEALED DEVICE AND LEAK TEST METHOD AND MANUFACTURING METHOD THEREOF

(75) Inventors: Hiroaki Sasaki, Nagoya (JP); Yasutoshi Yamanaka, Kariya (JP)

(73) Assignee: Denso Corporation, Kariya (JP)

( * ) Notice: Subject to any disclaimer, the term of this patent is extended or adjusted under 35 U.S.C. 154(b) by 308 days.

(21) Appl. No.: 12/001,217

(22) Filed: Dec. 11, 2007

(65) Prior Publication Data
US 2008/0148819 A1 Jun. 26, 2008

(30) Foreign Application Priority Data
Dec. 26, 2006 (JP) ............... 2006-350421

(51) Int. Cl.
*G01M 3/04* (2006.01)
(52) U.S. Cl. ........................................ 73/40.7
(58) Field of Classification Search .............. 73/40.7
See application file for complete search history.

(56) References Cited

U.S. PATENT DOCUMENTS

| | | | | |
|---|---|---|---|---|
| 4,838,073 A | * | 6/1989 | Jansch | 73/40.7 |
| 4,918,975 A | * | 4/1990 | Voss | 73/40.7 |
| 5,287,730 A | * | 2/1994 | Condon | 73/49.8 |
| 5,331,841 A | * | 7/1994 | Beaver et al. | 73/49.2 |
| 5,563,336 A | * | 10/1996 | Mallet | 73/49.1 |
| 6,314,794 B1 | * | 11/2001 | Seigeot | 73/40.7 |
| 7,150,180 B2 | * | 12/2006 | Werner | 73/40.7 |
| 7,500,382 B2 | * | 3/2009 | Werner | 73/46 |

FOREIGN PATENT DOCUMENTS

| | | |
|---|---|---|
| JP | 11-030565 | 2/1999 |
| JP | 2002-134164 | 5/2002 |
| JP | 2006-053106 | 2/2006 |

* cited by examiner

*Primary Examiner*—David A. Rogers
*Assistant Examiner*—Rodney T Frank
(74) *Attorney, Agent, or Firm*—Harness, Dickey & Pierce, PLC

(57) ABSTRACT

An inner sealing portion seals a tubular port, which is provided to a receiver that receives water, at a first location of the tubular port. An outer sealing portion seals the tubular port at a second location of the tubular port spaced from the first location on an outer side of the inner sealing portion. A sealed space is formed between the inner sealing portion and the outer sealing portion. A tracer gas for performing a leak test of the outer sealing portion is enclosed in the sealed space. An amount of outwardly leaked tracer gas, which leaks from the sealed space through the outer sealing portion, is measured with a leak test device.

15 Claims, 6 Drawing Sheets

FIG. 3

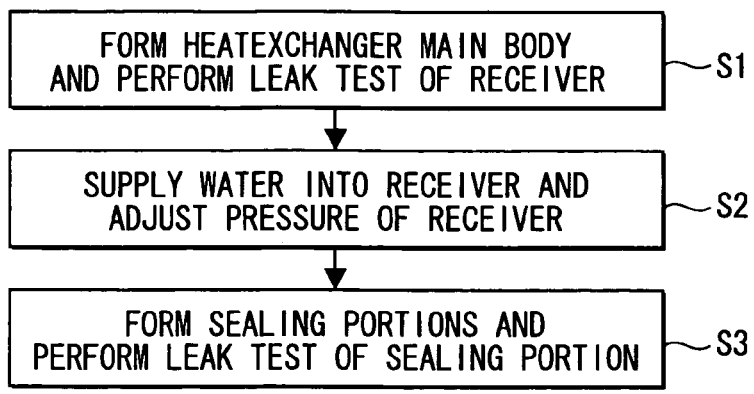

- S1: FORM HEATEXCHANGER MAIN BODY AND PERFORM LEAK TEST OF RECEIVER
- S2: SUPPLY WATER INTO RECEIVER AND ADJUST PRESSURE OF RECEIVER
- S3: FORM SEALING PORTIONS AND PERFORM LEAK TEST OF SEALING PORTION

FIG. 4

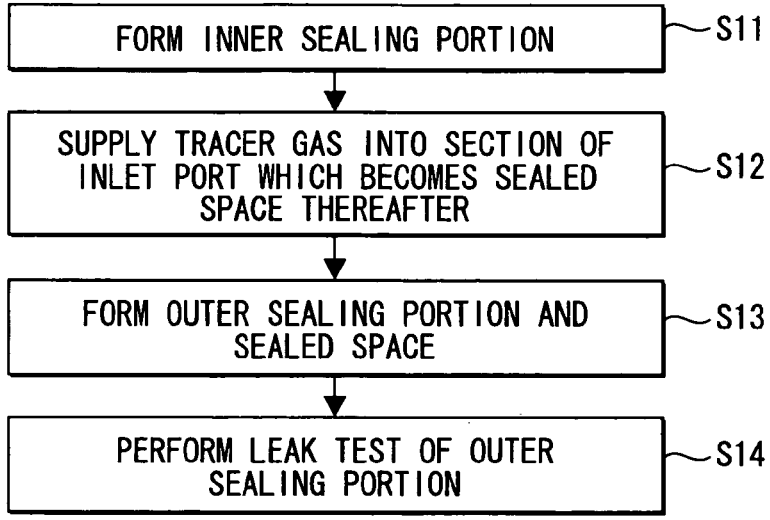

- S11: FORM INNER SEALING PORTION
- S12: SUPPLY TRACER GAS INTO SECTION OF INLET PORT WHICH BECOMES SEALED SPACE THEREAFTER
- S13: FORM OUTER SEALING PORTION AND SEALED SPACE
- S14: PERFORM LEAK TEST OF OUTER SEALING PORTION

FIG. 5

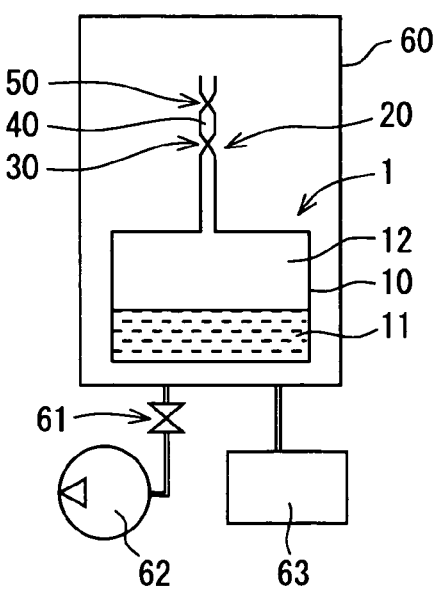

FIG. 8
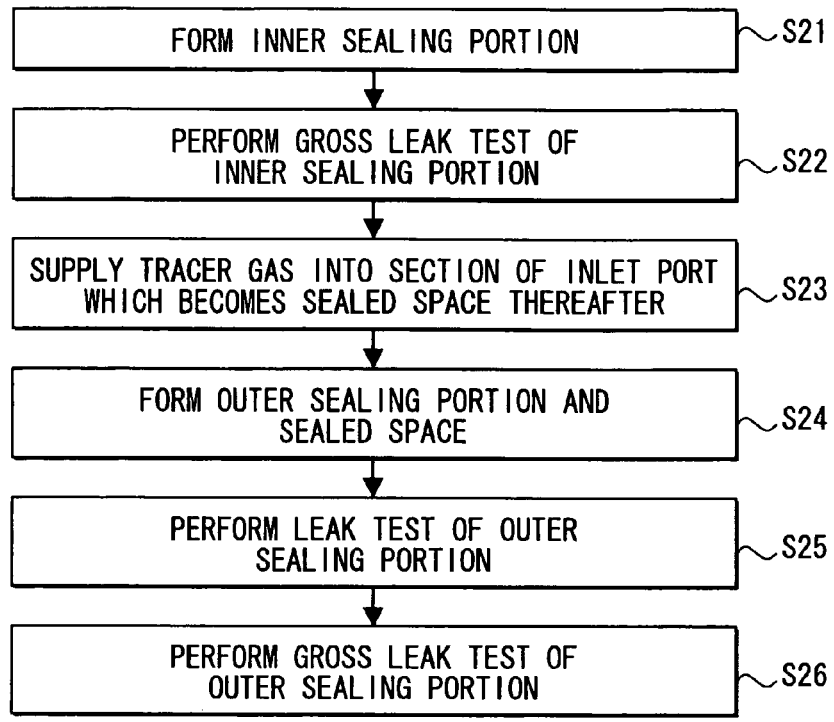
FIG. 9
FIG. 10
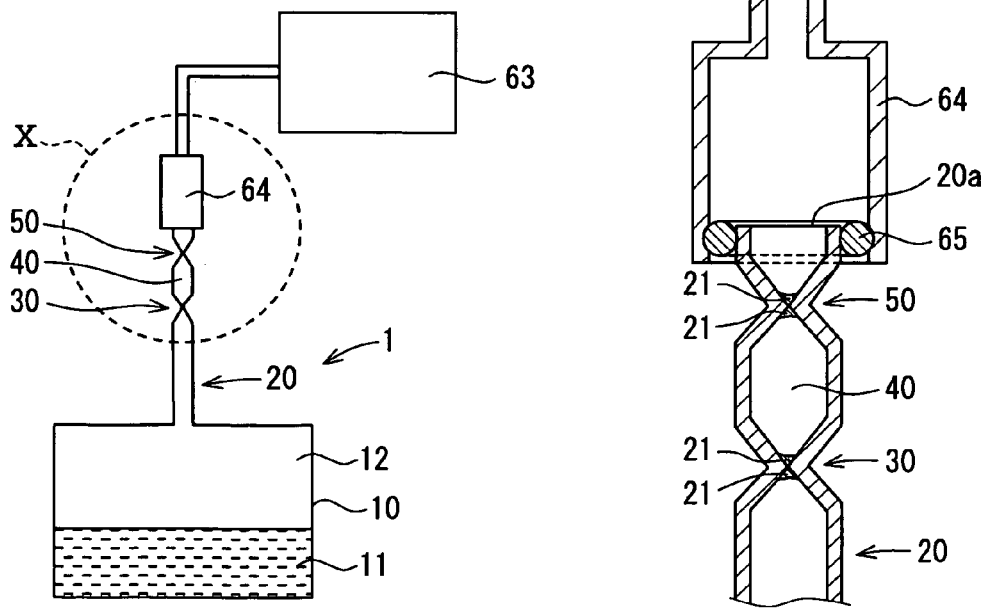

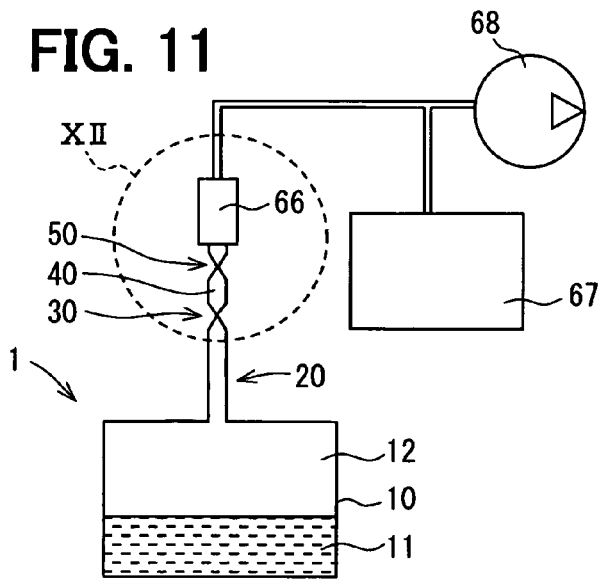
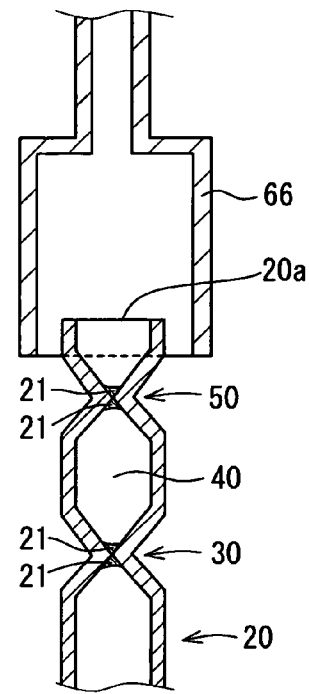
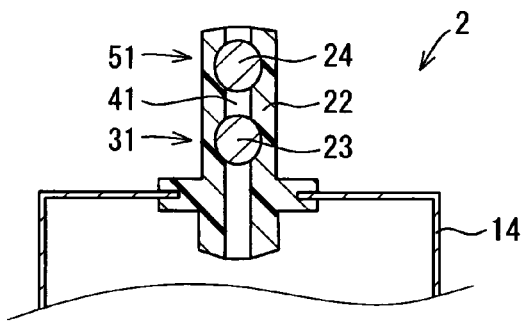
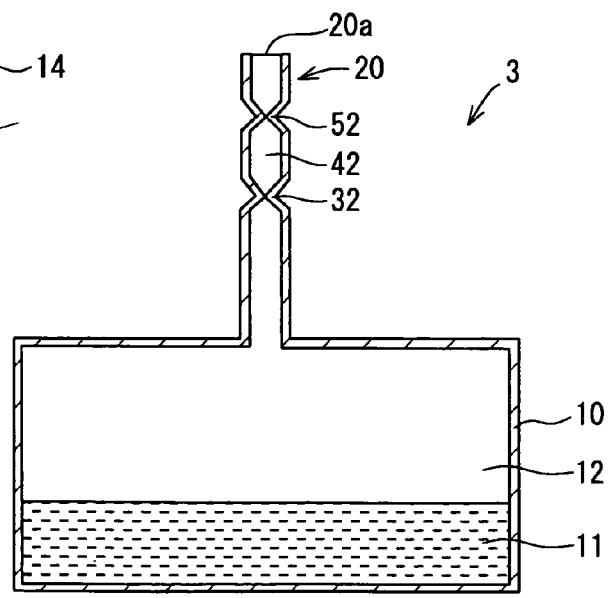

SEALED DEVICE AND LEAK TEST METHOD AND MANUFACTURING METHOD THEREOF

CROSS REFERENCE TO RELATED APPLICATION

This application is based on and incorporates herein by reference Japanese Patent Application No. 2006-350421 filed on Dec. 26, 2006.

BACKGROUND OF THE INVENTION

1. Field of the Invention

The present invention relates to a sealed device, and a leak test method thereof and a manufacturing method thereof.

2. Description of Related Art

Previously, a leak test, which uses a bombing method, is performed to test a fluid-tightness (gas-tightness) of a sealed device (see, for example, Japanese Unexamined Patent Publication No. H11-305665 and Japanese Unexamined Patent Publication No. 2006-53106). In the bombing method, the sealed device is placed in a bombing device, and a gas is evacuated from the interior of the bombing device. Thereafter, a tracer gas, such as helium (He) gas, is supplied into the interior of the bombing device, and the sealed device is pressurized (bombed) from the outside thereof with the tracer gas for several hours. At this time, when the sealed device has a leak, the tracer gas leaks into the sealed device at a rate, which corresponds to a size of the leak. Upon completion of the bombing, the sealed device is removed from the bombing device and is placed in a vacuum chamber. Then, the interior of the vacuum chamber is depressurized, and the amount of the outwardly leaked tracer gas (the leak rate of the tracer gas) from the sealed device is measured. The fluid-tightness of the sealed device is evaluated based on the amount of the outwardly leaked tracer gas, which is measured in the above-described manner.

Another method of measuring the leakage of the sealed device, which is other than the bombing method, is described in, for example, Japanese Unexamined Patent Publication No. 2002-134164. In this method, a tracer gas, such as helium (He) gas, is previously sealed into an interior of the sealed device during manufacturing thereof. In this method, the tracer gas of a relatively large amount and a relatively high concentration is filled into the interior of the sealed device within a relatively short time period, so that this method is advantageous over the bombing method.

However, in some cases, an upper limit exists on the enclosable amount of the tracer gas, which can be enclosed in the interior of the sealed device, to limit a substantial deterioration of the performance of the heat exchanger. For example, in some sealed heat exchangers, a pressure of a non-condensable gas, such as a tracer gas, in the interior of the heat exchanger needs to be kept equal to or less than a predetermined pressure (e.g., 5 kPa) throughout a product lifetime thereof. Thus, the amount of the tracer gas, which can be enclosed in the sealed device in the manufacturing thereof, should be relatively small in view of the fact that non-condensable gases of the surrounding atmosphere gradually leak into the interior of the sealed device during a period of actual use of the sealed device. Thus, the sufficient amount of the tracer gas cannot be leaked from the sealed device to allow measurement of the amount of outwardly leaked tracer gas. Therefore, the leak test of the sealed device becomes difficult.

Also, it is conceivable to perform the leak test by measuring the outward leakage of an enclosed liquid or vaporized gas thereof from the sealed device (e.g., water or water vapor in the case of the heat exchanger having the water enclosed therein). However, the water or the water vapor does not allow measurement of a fine leak from the sealed device with a high sensitivity. Thus, in this case, it is difficult to perform the leak test on the sealed device, which needs to have the high degree of fluid-tightness.

SUMMARY OF THE INVENTION

The present invention addresses the above disadvantage. Thus, it is an objective of the present invention to provide a sealed device, which can ease its leak test, a leak test method thereof, and a manufacturing method thereof.

To achieve the objective of the present invention, there is provided a sealed device, which includes a receiver, a tubular port, a first sealing portion, a second sealing portion and a sealed reservoir space. The receiver receives a content. The tubular port is provided to the receiver. The first sealing portion seals the tubular port at a first location of the tubular port. The second sealing portion seals the tubular port at a second location of the tubular port spaced from the first location on an outer side of the first sealing portion. The sealed reservoir space is formed between the first sealing portion and the second sealing portion and is adapted to hold a leak tracer fluid therein for at least a predetermined time period.

To achieve the objective of the present invention, there is also provided a leak test method for testing a leak of a sealed device that includes a receiver, which receives a content; a tubular port, which is provided to the receiver; a first sealing portion, which seals the tubular port at a first location of the tubular port; a second sealing portion, which seals the tubular port at a second location of the tubular port spaced from the first location on an outer side of the first sealing portion; and a sealed reservoir space, which is formed between the first sealing portion and the second sealing portion and encloses a tracer gas therein. According to the leak test method, an outer end of the tubular port is communicated with a leak test device. Then, an amount of outwardly leaked tracer gas, which leaks from the sealed reservoir space through the second sealing portion, is measured with the leak test device.

To achieve the objective of the present invention, there is further provided a manufacturing method of a sealed device. According to the manufacturing method, a receiver, which is provided with a tubular port, is formed. Then, a first sealing portion is formed at a first location of the tubular port to seal the tubular port. Thereafter, a tracer gas is filled on an outer side of the first sealing portion in the tubular port. Next, a second sealing portion is formed at a second location of the tubular port spaced from the first location on the outer side of the first sealing portion while the tracer gas is still filled in the tubular port to create a sealed reservoir space filled with the tracer gas between the first sealing portion and the second sealing portion in the tubular port. Then, an outer end of the tubular port is communicated with a leak test device to perform a leak test of the second sealing portion. Thereafter, an amount of outwardly leaked tracer gas, which leaks from the sealed reservoir space through the second sealing portion, is measured with the leak test device.

BRIEF DESCRIPTION OF THE DRAWINGS

The invention, together with additional objectives, features and advantages thereof, will be best understood from the following description, the appended claims and the accompanying drawings in which:

FIG. 3 is a flowchart schematically showing a flow of a manufacturing process and a leak test process of the heat exchanger according to the first embodiment;

FIG. 4 is a flowchart showing a forming process of the inner sealing portion and the outer sealing portion and a leak test process of the outer sealing portion;

FIG. 5 is a schematic diagram showing an exemplary leak test process for testing the leak of the outer sealing portion;

FIG. 8 is a flowchart showing a forming process of the inner sealing portion and the outer sealing portion and a leak test process of the inner sealing portion and the outer sealing portion in a case where a gross leak of the inner sealing portion and a gross leak of the outer sealing portion are both tested;

FIG. 9 is a schematic diagram showing a first modification of the leak test process of the heat exchanger of the first embodiment;

FIG. 10 is a cross sectional view of a portion X in FIG. 9;

FIG. 11 is a schematic diagram showing a second modification of the leak test process of the heat exchanger of the first embodiment;

FIG. 12 is a cross sectional view of a portion XII in FIG. 11;

FIG. 13 is a cross sectional view schematically showing a third modification of the structure of the heat exchanger of the first embodiment;

FIG. 14 is a cross sectional view schematically showing a structure of a heat exchanger according to a second embodiment of the present invention;

DETAILED DESCRIPTION OF THE INVENTION

First Embodiment

Figure 1:
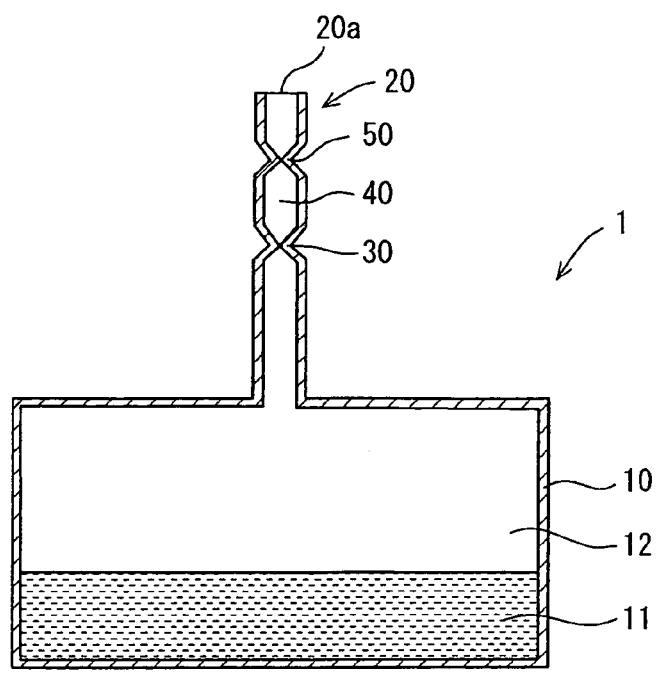
FIG. 1 is a cross sectional view schematically showing a structure of a heat exchanger according to a first embodiment of the present invention.

A first embodiment of the present invention will be described with reference to FIGS. 1 to 13. FIG. 1 is a schematic cross sectional view of a sealed heat exchanger (serving as a sealed device) 1 of the first embodiment, in which water (or water solution or any other solution with additives, such as anti-freezing agent) 11 is enclosed as coolant (or refrigerant). Although an actual heat exchanger would have a more complex structure with tubes, fins, and header tanks, etc., FIG. 1 shows the heat exchanger 1 in a simplified form for illustrative purpose. The heat exchanger 1 of the present embodiment may be used as a heat exchanger of a waste heat recovery system, which recovers the heat energy from the exhaust gas of an internal combustion engine of a vehicle. As shown in FIG. 1, the heat exchanger 1 includes a receiver 10 and a tubular inlet port (opening) 20. The receiver 10 receives the water (content) 11. The tubular inlet port 20 has an opening end 20a, through which the water 11 is supplied into the receiver 10. A negative pressure is maintained in a remaining interior space 12 of the receiver 10, which is located above the water 11 and is thereby not occupied by the water 11. The receiver 10 and the inlet port 20 are made of, for example, metal. The heat exchanger 1 further includes an inner sealing portion (a first sealing portion) 30 and an outer sealing portion (a second sealing portion) 50. The inner sealing portion 30 seals the inlet port 20 at a first location of the inlet port 20 to seal the interior of the receiver 10. The outer sealing portion 50 seals the inlet port 20 at a second location of the inlet port 20 spaced from the first location on an outer side of the inner sealing portion 30, so that the outer sealing portion 50 is spaced further from the interior of the receiver 10 and further seals the inlet port 20 on the outer side (opening end 20a side) of the inner sealing portion 30. The outer sealing portion 50 serves as a terminal sealing portion that finally seals the receiver 10. A sealed space (also referred to as a sealed reservoir space) 40 is formed between the inner sealing portion 30 and the outer sealing portion 50 in the heat exchanger 1.

Figure 2:
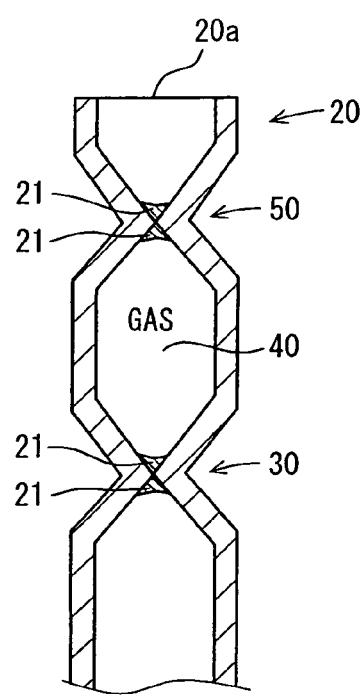
FIG. 2 is an enlarged cross sectional view showing a structure around an inner sealing portion and an outer sealing portion of the heat exchanger.

FIG. 2 is an enlarged cross-sectional view showing the vicinity of the inner sealing portion 30 and the outer sealing portion 50. As shown in FIG. 2, each of the inner sealing portion 30 and the outer sealing portion 50 is formed through a swaging process and a brazing process. In the swaging process, each corresponding part of the tubular inlet port 20 is radially inwardly swaged, i.e., is radially inwardly squeezed or pressed. Then, in the brazing process, a brazing material 21, which may have been previously applied to or may be currently applied to an inner surface of the tubular inlet port 20, is melted, so that a remaining opening of the swaged part of the tubular inlet port 20 at each corresponding sealing portion 30, 50 is sealed with the brazing material 21. The sealed space 40 is sealed by a tubular wall of the inlet port 20, the inner sealing portion 30 and the outer sealing portion 50. An interior of the sealed space 40 is isolated from the interior space 12 of the receiver 10 by the inner sealing portion 30 and is also isolated from an outside of the heat exchanger 1 by the outer sealing portion 50. A volume of the sealed space 40 is set to be smaller than a volume of the remaining interior space 12 of the receiver 10, which is not occupied by the water 11.

A leak tracer fluid, more specifically a leak tracer gas (or a gas including a tracer gas), which is used for a leak test of the outer sealing portion 50, is filled and is enclosed in the sealed space 40 during the manufacturing. A portion of the sealed tracer gas leaks from the sealed space 40 during the leak test of the outer sealing portion 50, and the rest of the tracer gas remains in the sealed space 40. Argon, hydrogen or sulfur hexafluoride may be used as the tracer gas. However, in a case where a high sensitivity is an important issue, it is advantageous to select helium (He) as the tracer gas. The amount of the enclosed tracer gas, which is enclosed in the sealed space 40 during the manufacturing, is adjusted such that a sum of the amount of the enclosed tracer gas, which remains in the sealed space 40 after the leak test, and the amount of inwardly leaked gas (or an expected amount of inwardly leaked gas), which leaks from the outside of the heat exchanger 1 into the sealed space 40 through the outer sealing portion 50 during the product lifetime of the heat exchanger 1, is equal to or less than an allowable amount of gas, which is allowed to leak into the interior of the receiver 10. The amount of the enclosed tracer gas can be adjusted by changing the pressure of the enclosed tracer gas and/or the volume of the sealed space 40. The amount of the other inwardly leaked gas, which leaks into the sealed space 40 during the product lifetime of the heat exchanger 1, is computed based on an equivalent standard leak (also referred to as an equivalent leak amount or an equivalent standard leak rate) of the outer sealing portion 50 described below. The allowable amount of gas, which is allowed to be leaked into the interior of the receiver 10, is the maximum amount of the inwardly leaked gas, which does not cause a substantial deterioration of the performance of the heat exchanger 1 even when the gas leaks into the interior of the receiver 10.

Next, the leak test method of the heat exchanger 1 and the manufacturing method of the heat exchanger 1, which includes such a leak test method, will now be described. The leak test of the sealed heat exchanger 1 is performed to check whether the outward leakage of the water 11 from the interior of the heat exchanger 1 and/or the inward leakage of the non-condensable gas from the outside into the interior of the heat exchanger 1 exists. FIG. 3 is a flowchart schematically showing a flow of a manufacturing process and a leak test process of the heat exchanger 1. As shown in FIG. 3, at step S1, a heat exchanger main body, which has the receiver 10 of a predetermined shape and the inlet port 20, is formed. Then, the leak test is performed on the receiver 10 of the heat exchanger main body. For example, the leak test of the receiver 10 may be performed by filling and enclosing the tracer gas into the receiver 10 and then measuring the amount of the outwardly leaked tracer gas, which has leaked to the outside of the receiver 10. Alternatively, the leak test of the receiver 10 may be performed by filling the tracer gas into a space (a test chamber), which contains the receiver 10, and then measuring the amount of inwardly leaked tracer gas, which leaks into the interior of the receiver 10.

Then, at step S2, the water 11 is supplied into the interior of the receiver 10 through the inlet port 20. Thereafter, the pressure of the interior space 12 of the receiver 10 is adjusted to a preset pressure (negative pressure).

Thereafter, the inner sealing portion 30 and the outer sealing portion 50 are formed at the inlet port 20, and the leak test of the outer sealing portion 50 is performed at step S3.

FIG. 4 is a flowchart showing the forming process of the inner sealing portion 30 and the outer sealing portion 50 and the leak test process of the outer sealing portion 50 performed at step S3. As shown in FIG. 4, at step S11, in the adjusted state where the pressure inside the space 12 of the receiver 10 is adjusted, the inlet port 20 is sealed by the swaging process and the brazing process to form the inner sealing portion 30. In this way, the receiver 10 is sealed with a predetermined degree of fluid-tightness, so that the pressure of the space 12 of the receiver 10 is maintained thereafter. The inner sealing portion 30 is formed to have a sufficient degree of fluid-tightness (sealing capability) for holding the He gas, which is enclosed in the sealed space 40 in the step performed thereafter, until the time of performing the leak test without leaking the water 11 in the receiver 10 to the sealed space 40 side.

Next, at step S12, the He gas of a predetermined pressure is introduced into a corresponding section of the inlet port 20 (the section of the inlet port 20, which forms the sealed space 40 thereafter), which is located on the opening end 20a side of the inner sealing portion 30. This step is performed by substantially evacuating the air from the section of the inlet port 20, which is located on the opening end 20a side of the inner sealing portion 30, and then filling the He gas to create an He gas atmosphere of a predetermined pressure.

Next, at step S13, while the He gas atmosphere of the predetermined pressure is maintained, a portion of the inlet port 20, which is located on the opening end 20a side of the inner sealing portion 30, is sealed through a swaging process and a brazing process to form the outer sealing portion 50 in a manner similar to that of the inner sealing portion 30. In this way, the sealed space 40, in which the He gas of the predetermined pressure is sealed, is formed between the outer sealing portion 50 and the inner sealing portion 30. The outer sealing portion 50 is formed to have a sufficient degree of fluid-tightness for holding the He gas, which is enclosed in the sealed space 40, until the time of performing the leak test. Here, the processing conditions at the time of forming the outer sealing portion 50 and the distance between the outer sealing portion 50 and the inner sealing portion 30 are set such that the fluid-tightness of the previously formed inner sealing portion 30 is not deteriorated. In this way, the heat exchanger 1 is formed.

Then, at step S14, the leak test of the outer sealing portion 50 is performed by using the He gas, which is enclosed in the sealed space 40. When the leak occurs at the outer sealing portion 50 or the inner sealing portion 30, the He gas in the sealed space 40 escapes and thereby decreases with time. Therefore, the leak test should be performed within a predetermined time period from the time of forming the outer sealing portion 50.

FIG. 5 is a schematic diagram showing an exemplary leak test process for testing the leak of the outer sealing portion 50 at step S14 described above. As shown in FIG. 5, the entire heat exchanger 1 is placed in a vacuum chamber 60. Next, a roughing valve (also referred to as a rough valve) 61 is opened, and a vacuum pump 62 is operated to evacuate, i.e., depressurize an interior of the vacuum chamber 60. When the internal pressure of the vacuum chamber 60 is decreased to a predetermined pressure, an He leak detector (a leak test device) 63, which measures He ions by mass spectrometry, is used to measure the amount of the outwardly leaked He gas, which leaks from the sealed space 40 through the outer sealing portion 50.

A measurable range of the leak test using the He gas as the tracer gas will be described. The measurable range can be obtained based on a relationship between a measured amount (also referred to as a measured leak or a measured leak rate) R of the outwardly leaked He gas, which is measured in the leak test, and the equivalent standard leak (also referred to as the equivalent standard leak rate as discussed above) L, which indicates the actual amount (or equivalent amount) of leaked air of the test object (i.e., the heat exchanger 1 in this instance). The relationship between the measured leak R (Pa·m³/s) and the equivalent standard leak L (Pa·m³/s) is expressed by the following equation (1).

$$R = \frac{L \cdot Pe}{Po}\left(\frac{Ma}{M}\right)^{1/2} e^{-\left(\frac{L \cdot T}{V \cdot Po}\left(\frac{Ma}{M}\right)^{1/2}\right)} \quad \text{Equation (1)}$$

Here, "Pe" is a charge pressure (Pa) of the enclosed He gas in the sealed space 40, and "Po" is an atmospheric pressure (=101325(Pa)). Furthermore, "Ma" is a molecular weight of the air (=29), and "M" is a molecular weight of He (=4). Also, "T" is a time period (seconds) between the time of sealing and enclosing the He gas (time of forming the outer sealing portion 50) and the time of performing the leak test, and V is a volume (m³) of the sealed space 40.

Now, the measurable range is obtained for an exemplary case where the charge pressure Pe of the enclosed He gas is 101325 Pa, and the time period T between the time of sealing and enclosing the He gas and the time of performing the leak test is 3600 seconds, and the volume V of the sealed space 40 is 0.000002 m³.

Figure 6:
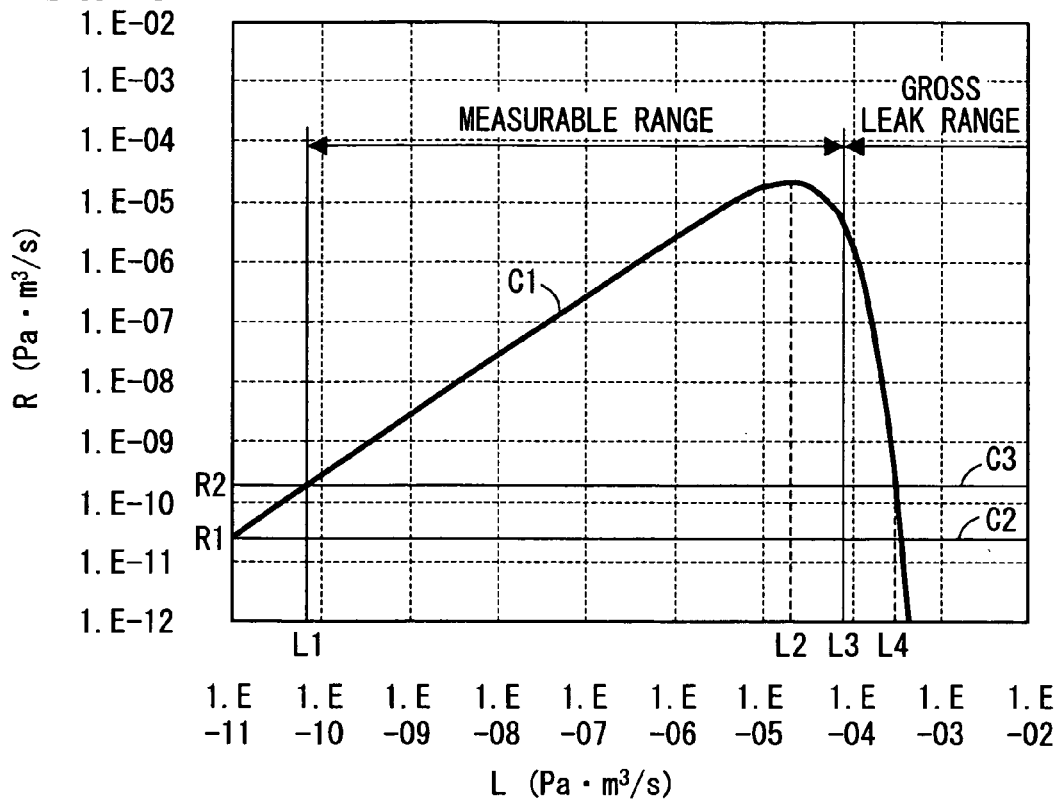
FIG. 6 is a graph, which indicates a relationship between a measured leak of He gas and an equivalent standard leak.

FIG. 6 is a graph, which indicates the relationship between the measured leak R of the He gas and the equivalent standard leak L. The axis of abscissas indicates the equivalent standard leak L (Pa·m³/s) expressed by the common logarithm, and the axis of ordinates indicates the measured leak R (Pa·m³/s) expressed by the common logarithm. A curve C1 indicates the relationship between the measured leak R and the equivalent standard leak L in the case where the above conditions (Pe=101325(Pa), T=3600(s), V=0.000002 (m³)) are applied to the above equation (1). Furthermore, a line C2 indicates a measured level (background (BG) level) R1 of the He gas in a case where no leak exists at the outer sealing portion 50. In addition, a line C3 indicates a required minimum measured leak level R2, which is required to obtain an S/N ratio based on the BG level R1.

As shown in FIG. 6, the curve C1 shows a maximum value at the equivalent standard leak L2. In a range where the equivalent standard leak L is equal to or less than the value L2, when the equivalent standard leak L increases, the measured leak R increases. In contrast, in a range where the equivalent standard leak L is larger than the value L2, when the equivalent standard leak L increases, the measured leak R rapidly decreases. This is due to the fact that when the equivalent standard leak L becomes large, the He gas in the sealed space 40 substantially leaks before the time of performing the leak test. Thus, the measurement of the amount of the outwardly leaked He gas becomes difficult.

A range of the equivalent standard leak L, which corresponds to the measured leak R (R≧R2) that enables the obtainment of the S/N ratio, is a range between a value L1 (a minimum value) and a value L4 (a maximum value). Specifically, the measurable range of the leak test should be a range that is equal to or greater than the value L1 but is equal to or less than the value L4. Here, it should be noted that the equivalent standard leak L4 is a value, at or above which the He gas leaks from the sealed space 40 before the time of performing the leak test, thereby disabling the leak test. Therefore, the maximum value of the measureable range should be kept smaller than the equivalent standard leak L4 for the safety reason in view of the fact that a change in the measured leak R relative to the equivalent standard leak L around the equivalent standard leak L4 is significant, and the curve C1 may possibly be deviated on the left side in FIG. 6 due to an error(s) in the preset conditions. Therefore, the maximum value of the measurable range is set to any value (e.g., the equivalent standard leak L3 ($\approx(L2\times L4)^{1/2}$)) between the equivalent standard leak L2, at which the measured leak R shows the maximum value along the curve C1, and the equivalent leak L4. In this way, the range, which is equal to or greater than L1 but is equal to or less than L3, is the measurable range of the leak test, which is performed under the above conditions. Furthermore, the range, which is greater than the equivalent standard leak L3, is a gross leak range, in which the He gas leaks before the time of performing the leak test to disable the leak test.

This measurable range can be adjusted by changing any one or more of the charge pressure Pe of the enclosed He gas, the time period T between the time of sealing the He gas and the time of performing the leak test, and the volume of the sealed space 40. For example, when the measurable range of the leak test needs to be increased on the gross leak side of the measurable range without increasing the amount of the charged He gas, the volume V of the sealed space 40 may be increased, and thereby the charge pressure Pe of the He gas may be reduced.

Figure 7:
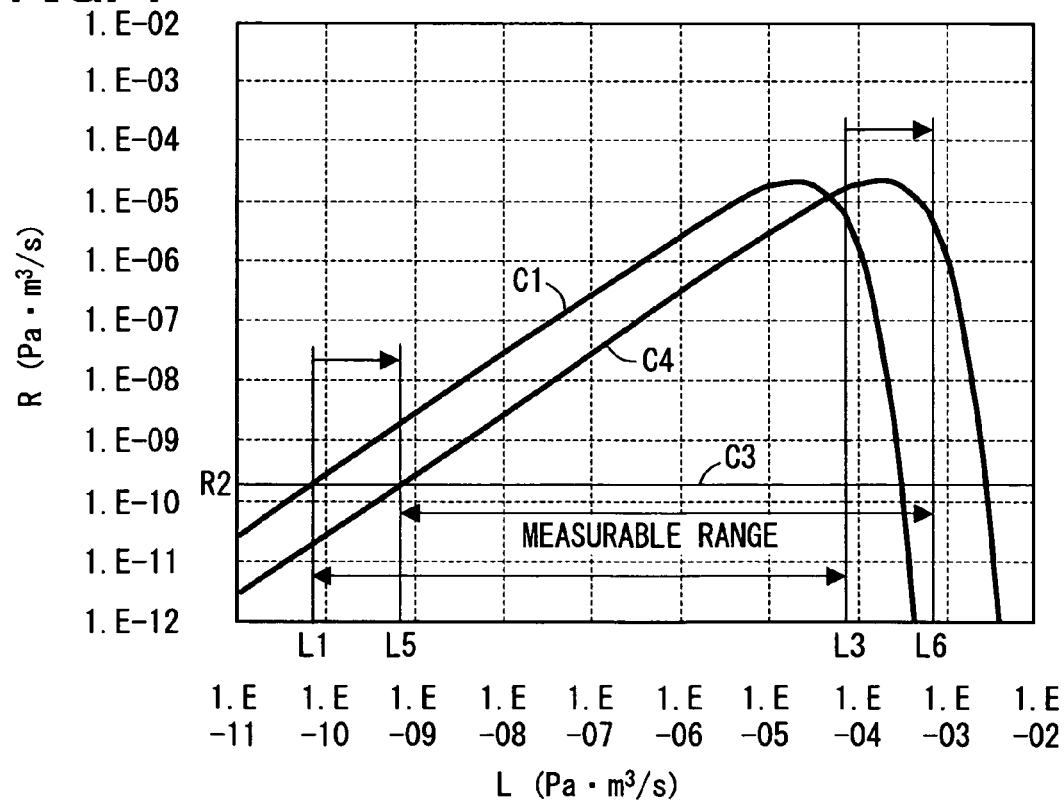
FIG. 7 is a graph showing a change in a measurable range in a case where a volume of a sealed reservoir space is increased, and thereby a charge pressure of the enclosed He gas is reduced.

FIG. 7 is a graph showing the change in the measurable range in the case where the volume V of the sealed space 40 is increased, and thereby the charge pressure Pe of the sealed He gas is reduced. In FIG. 7, the axis of abscissas, the axis of ordinates, the cure C1 and the line C3 are the same as those of FIG. 6. A curve C4 of FIG. 7 indicates the relationship between the measured leak R and the equivalent standard leak L for the case, in which Pe=10132.5(Pa), which is 1/10 of Pe used for the curve C1, T=3600s and V=0.000002 (m³), which is 10 times greater than V used for the curve C1, are applied to the equation (1).

As shown in FIG. 7, in the case, in which the volume V is increased from that of the curve C1, and the charge pressure Pe is reduced from that of the curve C1, the curve C4, which indicates the relationship between the measured leak R and the equivalent standard leak L, is shifted to the gross leak side (the right side in FIG. 7) from the curve C1. In this way, the maximum value of the measurable range becomes the equivalent standard leak L6 (>L3). Thus, due to the increase in the volume V and the decrease in the charge pressure Pe, the measurable range on the gross leak side is increased. However, in this case, the minimum value of the measurable range becomes the equivalent standard leak L5 (>L1), so that the measurable range on the minimum value side thereof is narrowed.

As described above, the leak in the gross leak range cannot be measured by using the He gas in the sealed space 40. Thus, depending on the processing capability in the process of forming the outer sealing portion 50, the leak test for testing the leakage in the gross leak range of the outer sealing portion 50 is required in some cases.

Here, it should be noted that the outer sealing portion 50 of the present embodiment serves as the terminal sealing portion of the receiver 10, and thereby it is not absolutely necessary to perform the leak test of the inner sealing portion 30. However, when the leak at the inner sealing portion 30 becomes large, the He gas, which is sealed in the sealed space 40, leaks to the receiver 10 side before the time of performing the leak test. In such a case, the leak test of the outer sealing portion 50 using the He gas becomes difficult. Thus, depending on the processing capability in the process of forming the inner sealing portion 30, the gross leak test of the inner sealing portion 30 may be required in some cases.

FIG. 8 is a flowchart showing the forming process of the inner sealing portion 30 and the outer sealing portion 50 and the leak test process of the inner sealing portion 30 and the outer sealing portion 50 in the case where a gross leak of the inner sealing portion 30 and a gross leak of the outer sealing portion 50 are both tested at step S3 of FIG. 3.

With reference to FIG. 8, similar to step S1 of FIG. 4, at step S21, the inner sealing portion 30 is formed.

Then, at step S22, the gross leak test of the inner sealing portion 30 is performed by using, for example, a differential pressure leak tester. In this gross leak test, it is checked whether the inner sealing portion 30 has the sufficient fluid-tightness for holding the tracer gas in the sealed space 40 from the time of forming the outer sealing portion 50 (step S24) to the time of performing the leak test of the outer sealing portion 50 (step S25) without leaking the water 11 in the receiver 10 to the sealed space 40 side.

Thereafter, at step S23, the He gas of the predetermined pressure is supplied into the section of the inlet port 20, which becomes the sealed space 40 thereafter, in a manner similar to that of step S12 of FIG. 4.

Then, at step S24, the outer sealing portion 50 and the sealed space 40 are formed in a manner similar to that of step S13 of FIG. 4.

Then, at step S25, the leak test of the outer sealing portion 50 is performed in a manner similar to that of step S14 of FIG. 4.

Then, at step S26, the gross leak test of the outer sealing portion 50 is executed by using, for example, the differential pressure leak tester. In this gross leak test, it is checked whether the outer sealing portion 50 has the sufficient fluid-tightness for holding the tracer gas in the sealed space 40 until the time of performing the leak test of the outer sealing portion 50 at step S25. If the outer sealing portion 50 does not have the sufficient fluid-tightness described above, the leakage, which falls into the gross leak range, exists even when the measured leak R, which is measured in the leak test at step S25, is equal to or less than R2. This gross leak test may be performed before the leak test at step S25. Even in such a case, the leak test of step S25 needs to be performed within the predetermined time period started from the time of forming the outer seal portion 50.

As described above, the heat exchanger 1 of the present embodiment is sealed by the inner sealing portion 30 and is also sealed by the outer sealing portion 50, which is formed on the outer side of the inner sealing portion 30 while the sealed space 40 is held between the inner sealing portion 30 and the outer sealing portion 50. The outer sealing portion 50, which functions as the terminal sealing portion, is not located adjacent to the interior of the receiver 10. Therefore, when the leak test of the outer sealing portion 50 is performed, it is possible to reduce the influences of the leak test to the interior of the receiver 10. In the present embodiment, although the amount of the He gas, which can be previously charged and enclosed into the receiver 10, is limited to a certain upper limit, the He gas, which has the high concentration and/or high partial pressure, can be charged and enclosed into the sealed space 40, which is spaced from the interior of the receiver 10. Thus, the sufficient amount of the He gas, which is sufficient to allow the measurement of the amount of the outwardly leaked He gas, can be leaked, so that the leak test of the heat exchanger 1 can be easily performed.

Also, in the present embodiment, the inner sealing portion 30 and the outer sealing portion 50 are formed to have the sufficient fluid-tightness for holding the He gas, which is enclosed in the sealed space 40, until the time of performing the leak test. Thus, it is possible to limit the leakage (i.e., the leakage causing the leak test difficult) of the He gas enclosed in the sealed space 40 before the time of performing the leak test.

Furthermore, in the present embodiment, when the gross leak occurs at the inner sealing portion 30 where the leak test is difficult, all of the He gas, which is enclosed in the sealed space 40, may possibly leak into the interior of the receiver 10 during the actual practical use of the heat exchanger 1. However, according to the present embodiment, the sum of the amount of the enclosed He gas in the sealed space 40 and the amount of inwardly leaked gas, which leaks into the sealed space 40 during the product lifetime, is equal to or smaller than the allowable amount of gas described above. Therefore, it is possible to limit the deterioration of the performance of the heat exchanger 1.

Also, according to the present embodiment, the volume of the sealed space 40 is smaller than the volume of the remaining space 12 of the receiver 10, which is not occupied by the water 11. When the volume of the sealed space 40, into which the He gas is enclosed, is set to be relatively small, the concentration and/or the partial pressure of the He gas in the sealed space 40 can be made relatively large. Thus, the amount of the He gas, which is used in the leak test, can be reduced, and the leak test of the heat exchanger 1 is eased.

Furthermore, according to the present embodiment, the outer sealing portion 50, for which the leak test with the tracer gas is performed, does not contact the water 11, so that the outward leakage of the tracer gas through a breach (a leak) in the outer sealing portion 50 is not limited by wetting of the outer sealing portion 50 with the water 11. More specifically, the outer sealing portion 50, for which the leak test with the tracer gas is performed, is advantageously limited from contacting with the liquid, such as the water, which is received in the receiver 10. In contrast to this, in a case where this type of leak test is performed to test the fluid-tightness of a single sealing portion of the inlet port, when the sealing portion has a very small breach, application of the liquid (e.g., the water) received in the receiver to this very small breach of the sealing portion may possibly temporarily seal the breach and thereby temporarily prevent leakage of the tracer gas therethrough. When this happens, the defective sealed device, which has such a breach in the sealing portion, may pass the leak test and may be determined as a normal sealed device rather than the defective sealed device. Unlike such a case, in the present embodiment where the inner sealing portion and the outer sealing portion are provided in the inlet port, the application of the liquid, such as the water, to the outer sealing portion is well limited. Thus, the above test error may be advantageously limited.

In addition, according to the present embodiment, the measurable range of the leak test can be adjusted by changing at least one of the pressure Pe of the enclosed He gas, the time period T between the time of sealing and enclosing the He gas and the time of performing the leak test, and the volume V of the sealed space 40.

According to the present embodiment, the step of bombing the heat exchanger 1 with the He gas is not required, so that the leak test can be more simplified.

Furthermore, according to the present embodiment, the inlet port 20 is sealed at the two locations, i.e., the inner sealing portion 30 and the outer sealing portion 50, so that the reliability in terms of the fluid-tightness of the heat exchanger 1 can be improved.

FIG. 9 is a schematic diagram showing a first modification of the leak test process (step S14 of FIG. 4 and step S25 of FIG. 8) of the heat exchanger 1. FIG. 10 is a cross sectional view of a portion X in FIG. 9. As shown in FIGS. 9 and 10, the leak test process of the present modification differs from the leak test process of FIG. 5 in that a relatively small chamber 64, which surrounds a vicinity of the opening end 20a of the inlet port 20, is used in the leak test process of FIGS. 9 and 10. The chamber 64 is connected to the He leak detector (leak test device) 63, which has a suctioning function for suctioning fluid. A seal 65, which has a relatively high resiliency, is provided to an inner peripheral surface of a distal end portion of the chamber 64.

At the time of performing the leak test, the chamber 64 is fitted around the inlet port 20. In this way, the vicinity of the opening end 20a of the inlet port 20 is fluid-tightly surrounded by the chamber 64 and the seal 65. Now, the leak detector 63, which has the suctioning function, is operated, so that a section of the inlet port 20, which is located on the opening end 20a side of the outer sealing portion 50, is depressurized. Then, when the pressure at the opening end 20a side of the outer sealing portion 50 is dropped to a predetermined pressure, the amount of outwardly leaked He gas, which leaks thorough the outer sealing portion 50, is measured with the leak detector 63.

According to the present modification, the leak test can be performed by depressurizing the small chamber 64, which is smaller than the vacuum chamber 60 that receives the entire heat exchanger 1. Therefore, the required depressurizing time period can be reduced, and thereby the leak test can be simplified.

FIG. 11 is a schematic diagram showing a second modification of the leak test process of the heat exchanger 1 of the present embodiment, and FIG. 12 is an enlarged cross sectional view of a portion XII in FIG. 11. As shown in FIGS. 11 and 12, according to the present modification, a suction probe 66 and a gas measurement device (a leak test device) 67 are used, and the leak test of the outer sealing portion 50 is performed under the atmospheric pressure.

At the time of performing the leak test, the suction probe 66 is fitted around the inlet port 20. In this way, the vicinity of the opening end 20a of the inlet port 20 is loosely surrounded by the suction probe 66. Then, a pump 68 is operated to create a gas flow, which promotes movement of the gas from the suction probe 66. In this way, the gas of the suction probe 66, which includes the He gas that leaks through the outer sealing portion 50, is moved toward the pump 68 side. The leak test of the outer sealing portion 50 is performed by measuring the He gas concentration in the gas, which moves toward the pump 68 side, through use of the gas measurement device 67.

In general, the leak test, which is performed under the atmospheric pressure like in the caser of the present modification, shows a lower sensitivity in comparison to the leak test, which is performed under the vacuum atmosphere. However, the leak test, which is performed under the atmospheric pressure like in the case of the present modification, does not require depressurization of the chamber, so that the leak test can be simplified.

However, when the leak occurs at the outer sealing portion 50, the He gas, which is enclosed in the sealed space 40, decreases with time. Thus, even in the first or second modification, the leak test needs to be performed within the predetermined period from the time of forming the outer sealing portion 50.

FIG. 13 is a cross sectional view of a third modification of the heat exchanger of the present embodiment. As shown in FIG. 13, the heat exchanger 2 of the present modification includes a receiver 14 and an inlet port 22. The receiver 14 is made of a metal material and receives water. The inlet port 22 is made of a resin material and is connected to the receiver 14 to supply the water into the receiver 14. Furthermore, the heat exchanger 2 includes an inner sealing portion 31 and an outer sealing portion 51. The inner sealing portion 31 is formed by inserting a sealing ball 23 into the inlet port 22 and then inwardly swaging the inlet port 22 around the sealing ball 23 by hot swaging to fluid tightly hold the sealing ball 23 with the inner peripheral wall of the inlet port 22. Also, the outer sealing portion 51 is formed by inserting a sealing ball 24 into a section of the inlet port 22, which is located on an outer side of the inner sealing portion 31, and then inwardly swaging the inlet port 22 around the sealing ball 24 by hot swaging to fluid tightly hold the sealing ball 24 with the inner peripheral wall of the inlet port 22. A sealed space 41 is formed between the inner sealing portion 31 and the outer sealing portion 51 in the inlet port 22. The He gas, which serves as the tracer gas, is enclosed in the sealed space 41.

Even in the case of the heat exchanger 2 of the present modification, advantages similar to those of the heat exchanger 1 shown in FIGS. 1 and 2 can be achieved.

Here, the inner sealing portion and the outer sealing portion may be formed by a ultrasound connecting process. Also, in some cases, the inner sealing portion and the outer sealing portion may be formed by different methods, respectively.

Second Embodiment

Next, a second embodiment of the present invention will be described with reference to FIGS. 14 to 16. FIG. 14 is a schematic cross sectional view of a sealed heat exchanger 3, which serves as a sealed device. As shown in FIG. 14, similar to the heat exchanger 1 of the first embodiment, the heat exchanger 3 includes the receiver 10 and the inlet port 20. Furthermore, the heat exchanger 3 includes an inner sealing portion 32, an outer sealing portion 52 and a sealed space 42. The inner sealing portion 32 seals a portion of the inlet port 20 to seal the interior space of the receiver 10. The outer sealing portion 52 seals another portion of the inlet port 20, which is located on an opening 20a side of the inner sealing portion 32. The sealed space 42 is formed between the inner sealing portion 32 and the outer sealing portion 52.

An interior of the sealed space 42 is isolated from the interior space of the receiver 10 by the inner sealing portion 32 and is also isolated from an outside of the heat exchanger 3 by the outer sealing portion 52. A volume of the sealed space 42 is smaller than the volume of the remaining space 12 of the receiver 10, which is not occupied by the water 11. Unlike the sealed space 40 of the first embodiment, a tracer gas, such as He gas, is not enclosed in the sealed space 42. The gas, which is the same as the gas enclosed in the space 12, is enclosed in the sealed space 42 at the same pressure as that (e.g., negative pressure) of the space 12.

Next, the leak test method of the heat exchanger 3 and the manufacturing method of the heat exchanger 3, which includes such a leak test method, will now be described. Here, steps of forming of the heat exchanger main body, supplying of the water 11 into the receiver 10 and adjusting of the pressure in the receiver 10 are the same as those of the manufacturing process and the leak test process of the heat exchanger 1 of the first embodiment shown in FIG. 3 (steps S1 and S2 of FIG. 3) and thereby will not be described further for the sake of simplicity.

Figure 15:
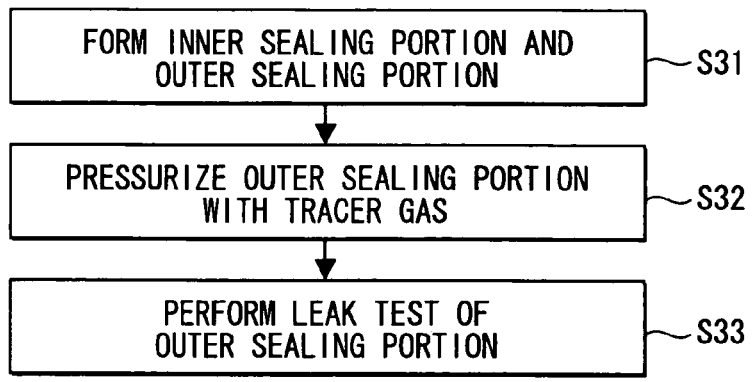
FIG. 15 is a flowchart showing a forming process for forming an inner sealing portion and an outer sealing portion of the heat exchanger and a leak test process according to the second embodiment.

FIG. 15 is a flowchart showing the forming process for forming the inner sealing portion 32 and the outer sealing portion 52 and the leak test process, which are similar to those described at step S3 of FIG. 3. As shown in FIG. 15, the inlet port 20 is sealed at the two locations (inner location and outer location) upon adjustment of the pressure in the space 12 of the receiver 10 to form the inner sealing portion 32 and the outer sealing portion 52 in this step (step S31). In this step, the receiver 10 and the sealed space 42 are both sealed, so that the same gas of the same pressure is sealed in each of the space 12 and the sealed space 42. In this way, the heat exchanger 3 is produced.

Next, at step S32, the heat exchanger 3 is entirely placed in the bombing device, and the gas is evacuated from the interior of the bombing device. Then, the He gas is supplied into the bombing device, and the heat exchanger 3 is pressurized from the outside thereof with the He gas at a predetermined pressure for several hours. At this time, when a leak occurs at the outer sealing portion 52, the He gas leaks into the sealed space 42. The He gas, which leaks into the sealed space 42, may possibly enter into the interior of the receiver 10 when a leak occurs at the inner sealing portion 32. However, the pressure in the sealed space 42 and the pressure in the space 12 are generally the same. Thus, the amount of the He gas, which leaks into the interior of the receiver 10, is relatively small in comparison to the amount of the He gas, which leaks into the sealed space 42 from the outside of the heat exchanger 3. This step may be performed by using the bombing device, which surrounds only the vicinity of the opening end 20a.

When the above bombing process ends, the heat exchanger 3 is removed from the bombing device and is then placed in the vacuum chamber. Then, the vacuum chamber is depressurized, and the amount of the outwardly leaked He gas, which leaks from the outer sealing portion 52 is sensed with the He leak detector to execute the leak test at step S33. The leak test is performed within a predetermined time period, which is measured from the time of the ending of the bombing. This step may be performed by using the small chamber 64 of FIG. 9, which surrounds the vicinity of the opening end 20a of the inlet port 20, and the He leak detector 63 of FIG. 9, which is operable in the suctioning mode.

Here, the measureable range of the leak test can be obtained in a manner similar to that of the first embodiment using the equation (2), which expresses the relationship between the measured leak R (Pa·m³/s) of the He gas and the equivalent standard leak L (Pa·m³/s).

$$R = \frac{L \cdot Pe}{Po}\left(\frac{Ma}{M}\right)^{1/2}\left(1 - e^{-\left(\frac{L \cdot T1}{V \cdot Po}\left(\frac{Ma}{M}\right)^{1/2}\right)}\right) e^{-\left(\frac{L \cdot T2}{V \cdot Po}\left(\frac{Ma}{M}\right)^{1/2}\right)} \quad \text{Equation (2)}$$

Here, "Pe" is a pressurizing pressure (Pa) for pressurizing the heat exchanger 3 with the He gas, and "Po" is an atmospheric pressure (=101325(Pa)). Furthermore, "Ma" is a molecular weight of the air (=29), and "M" is a molecular weight of He (=4). Also, "T1" is a pressurizing time period (seconds) for pressurizing the heat exchanger 3 with the He gas, and "T2" is a time period (seconds) between the time of ending the pressurizing of the heat exchanger 3 with the He gas and the time of performing the leak test. Furthermore, "V" is a volume (m³) of the sealed space 42.

The measurable range can be adjusted by changing at least one of the pressurizing pressure Pe of the heat exchanger 3 with the He gas, the pressurizing time period T1, the time period T2 between the time of ending the pressurizing of the heat exchanger 3 and the time of performing of the leak test, and the volume V of the sealed space 42.

Here, it should be noted that the outer sealing portion 52 of the present embodiment serves as the terminal sealing portion of the receiver 10, and thereby it is not absolutely necessary to perform the leak test of the inner sealing portion 32. However, when the leak at the inner sealing portion 32 becomes large, the He gas, which is leaked into the sealed space 42 by the bombing, leaks to the receiver 10 side before the time of performing the leak test. In such a case, the leak test of the outer sealing portion 52 using the He gas becomes difficult. Thus, depending on the processing capability in the process of forming the inner sealing portion 32, the gross leak test of the inner sealing portion 32 may be required in some cases.

Furthermore, depending on the processing capability in the process of forming the outer sealing portion 52, the leak test for testing the leakage in the gross leak range of the outer sealing portion 52 is required in some cases.

Figure 16:
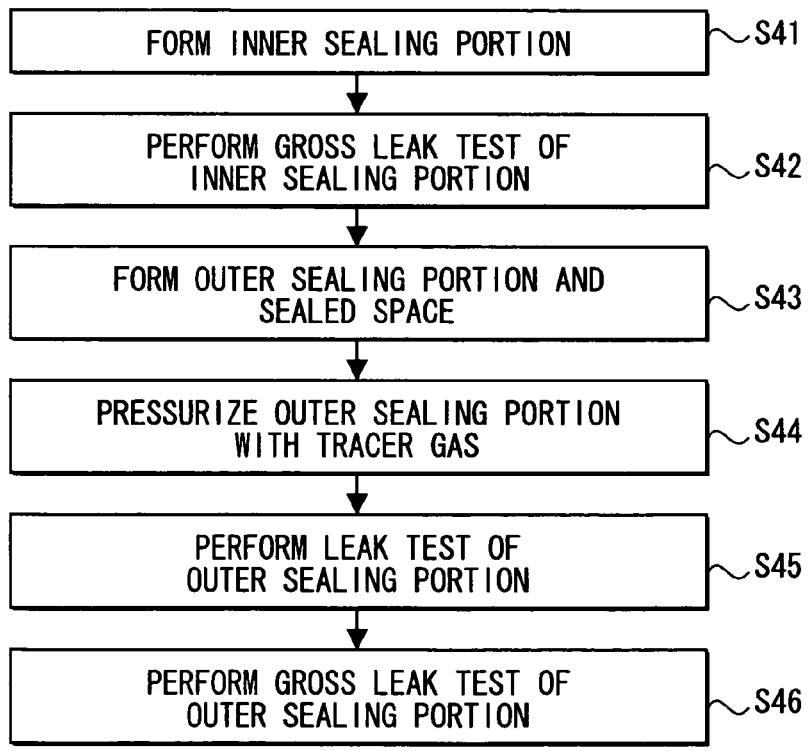
FIG. 16 is a flowchart showing a forming process for forming the inner sealing portion and the outer sealing portion and a leak test process in a case of performing a gross leak test for both of the inner sealing portion and the outer sealing portion.

FIG. 16 is a flowchart showing the forming process for forming the inner sealing portion 32 and the outer sealing portion 52 and the leak test process in a case of performing the gross leak test for both of the inner sealing portion 32 and the outer sealing portion 52.

As shown in FIG. 16, at step S41, in the adjusted state where the pressure inside the space 12 of the receiver 10 is adjusted, the inlet port 20 is sealed by the swaging process and the brazing process to form the inner sealing portion 32. In this way, the receiver 10 is sealed with a predetermined degree of fluid-tightness, so that the pressure of the space 12 of the receiver 10 is maintained thereafter.

Then, at step S42, the gross leak test of the inner sealing portion 32 is executed by using, for example, the differential pressure leak tester.

Thereafter, at step S43, the portion of the inlet port 20, which is located on the opening end 20a side of the inner sealing portion 32, is sealed by the swaging process and the brazing process under, for example, the atmospheric pressure to form the outer sealing portion 52. In this way, the sealed space 42 is formed between the outer sealing portion 52 and the inner sealing portion 32. At this time, for example, the gas, which is different from the gas enclosed in the space 12, may be enclosed in the sealed space 42 at the pressure, which is substantially equal to the atmospheric pressure. In this way, the heat exchanger 3 is formed.

Next, at step S44, the heat exchanger 3 is entirely placed in the bombing device, and the gas is evacuated from the interior of the bombing device. Then, the He gas is supplied into the bombing device, and the heat exchanger 3 is pressurized from the outside thereof with the He gas at a predetermined pressure for several hours. At this time, when a leak occurs at the outer sealing portion 52, the He gas leaks into the sealed space 42.

When the above bombing process ends, the heat exchanger 3 is removed from the bombing device and is then placed in the vacuum chamber. Then, the vacuum chamber is depressurized, and the amount of the outwardly leaked He gas, which leaks from the outer sealing portion 52, is sensed with the He leak detector to execute the leak test at step S45. The leak test is performed within a predetermined time period, which is measured from the time of the ending of the bombing.

Then, at step S46, the gross leak test of the outer sealing portion 52 is executed by using, for example, the differential pressure leak tester.

The heat exchanger 3 of the present embodiment is sealed by the inner sealing portion 32 and is also sealed by the outer sealing portion 52, which is formed on the outer side of the inner sealing portion 30 while the sealed space 40 is held between the inner sealing portion 32 and the outer sealing portion 52. The outer sealing portion 52, which functions as the terminal sealing portion, is not located adjacent to the receiver 10. Therefore, when the leak test of the outer sealing portion 52 is performed, it is possible to reduce the influences of the leak test to the interior of the receiver 10. In the present embodiment, the sealing space 42, into which the He gas is leaked by the bombing, is spaced from the receiver 10. As a result, the sufficient amount of the He gas, which is sufficient to allow the measurement of the amount of the outwardly leaked He gas, can leak through the outer sealing portion 52 upon the presence of the leak, so that the leak test of the heat exchanger 3 can be easily performed.

Furthermore, in the present embodiment, the sealing space 42, into which the He gas is leaked by the bombing, is relatively small. Thus, even in the case of the heat exchanger 3, which has the relatively large volume, the bombing time period can be reduced.

Furthermore, according to the present embodiment, the step of previously enclosing the tracer gas in the sealed space 42 is not required. Thus, the manufacturing process of the heat exchanger 3 can be simplified in comparison to the first embodiment.

Furthermore, in the present embodiment, the outer sealing portion 52, for which the leak test with the tracer gas is performed, does not contact the water 11, so that the inward leakage of the tracer gas through a breach at the outer sealing portion 52 at the time of the bombing and the outward leak of the tracer gas through the breach at the outer sealing portion 52 at the time of performing the leak test process are not limited by wetting of the outer sealing portion 52 with the water 11. More specifically, the outer sealing portion 52, for which the leak test with the tracer gas is performed, is advantageously limited from contacting with the liquid, such as the water, which is received in the receiver 10. In contrast to this, in the case where this type of leak test is performed to test the fluid-tightness of the single sealing portion of the inlet port, when the sealing portion has a very small breach, application of the liquid (e.g., the water) received in the receiver to this very small breach of the sealing portion may possibly temporarily seal the breach and thereby temporarily prevent leakage of the tracer gas therethrough. When this happens, the defective sealed device, which has such a breach in the sealing portion, may pass the leak test and may be determined as a normal sealed device rather than the defective sealed device. Unlike the previously proposed technique, in the present embodiment where the inner sealing portion and the outer sealing portion are provided in the inlet port, the application of the liquid, such as the water, to the outer sealing portion is well limited. Thus, the above test error of the previously propose technique may be advantageously limited.

Furthermore, according to the present embodiment, the inlet port 20 is sealed at the two locations, i.e., the inner sealing portion 32 and the outer sealing portion 52, so that the reliability in terms of the fluid-tightness of the heat exchanger 3 can be improved.

In the first and second embodiments, the present invention is implemented in the sealed heat exchanger, into which the water is enclosed. However, the present invention is not limited to the heat exchanger. For example, the present invention may be implemented in any other sealed device, into which other type of liquid is enclosed, such as a battery, into which electrolyte solution is enclosed. Also, the present invention may be implemented in any other sealed device, into which a solid or a gas is enclosed.

Additional advantages and modifications will readily occur to those skilled in the art. The invention in its broader terms is therefore not limited to the specific details, representative apparatus, and illustrative examples shown and described.

What is claimed is:

1. A sealed device comprising:
a receiver that receives a content;
a tubular port that is an inlet port, which is provided to the receiver and is adapted to conduct the content into the receiver at time of supplying the content into the receiver;
a first sealing portion that seals the tubular port at a first location of the tubular port;
a second sealing portion that seals the tubular port at a second location of the tubular port spaced from the first location on an outer side of the first sealing portion; and
a sealed reservoir space that is formed between the first sealing portion and the second sealing portion and is adapted to hold a leak tracer fluid therein for at least a predetermined time period.

2. The sealed device according to claim 1, wherein the leak tracer fluid is initially enclosed in the reservoir space.

3. The sealed device according to claim 1, wherein the reservoir space holds the leak tracer fluid therein when the leak tracer fluid leaks into the reservoir space through the second sealing portion during a leak test of the sealed device.

4. The sealed device according to claim 1, wherein:
the leak tracer fluid is a leak tracer gas; and
the first sealing portion has a predetermined degree of fluid-tightness to hold the tracer gas in the sealed reservoir space for at least the predetermined time period until time of performing a leak test of the sealed device.

5. The sealed device according to claim 1, wherein:
the leak tracer fluid is a leak tracer gas; and
the second sealing portion has a predetermined degree of fluid-tightness to hold the tracer gas in the sealed reservoir space for at least the predetermined time period until time of performing a leak test of the sealed device.

6. The sealed device according to claim 1, wherein:
the leak tracer fluid is a leak tracer gas; and
a sum of an amount of the enclosed tracer gas in the sealed reservoir space and an amount of inwardly leaked gas, which leaks from an outside of the sealed device into the sealed reservoir space through the second sealing portion during a product lifetime of the sealed device, is equal to or less than an allowable amount of gas, which is allowed to leak into the receiver.

7. The sealed device according to claim 1, wherein a volume of the sealed reservoir space is smaller than that of a remaining internal space of the receiver, which is not occupied by the content.

8. The sealed device according to claim 1, wherein the content is a liquid.

9. The sealed device according to claim 1, wherein:
the sealed device is a heat exchanger of a vehicle;
the content is a liquid coolant; and
the leak tracer gas includes helium.

10. The sealed device according to claim 1, wherein at least one of the first sealing portion and the second sealing portion has a sealing ball held by an inner peripheral wall of the tubular port.

11. The sealed device according to claim 1, wherein the tubular port is a single port provided to the receiver.

12. The sealed device according to claim 1, wherein the first sealing portion is disposed between the inlet port and the receiver, and the second sealing portion is disposed between the inlet port and the first sealing portion.

13. The sealed device according to claim 1, wherein the inlet port is a tubular inlet port in fluid communication with the receiver at a first end and is open at a second end opposite to said first end, said first sealing portion being disposed in said tubular inlet port between said open second end and said receiver, said second sealing portion being disposed in said tubular inlet port between said open second end and said first sealing portion.

14. A sealed device comprising:
a receiver that receives a content;
a tubular port that is provided to the receiver;
a first sealing portion that seals the tubular port at a first location of the tubular port;
a second sealing portion that seals the tubular port at a second location of the tubular port spaced from the first location on an outer side of the first sealing portion; and
a sealed reservoir space that is formed between the first sealing portion and the second sealing portion and is adapted to hold a leak tracer fluid therein for at least a predetermined time period, wherein the sealed reservoir space is configured to remain permanently between the first sealing portion and the second sealing portion in the sealed device.

15. A sealed device comprising:
a receiver that receives a content;
a tubular port that is provided to the receiver and has a tubular wall;
a first sealing portion that seals the tubular port at a first location of the tubular port;
a second sealing portion that seals the tubular port at a second location of the tubular port spaced from the first location on an outer side of the first sealing portion; and
a sealed reservoir space that is formed between the first sealing portion and the second sealing portion and is adapted to hold a leak tracer fluid therein for at least a predetermined time period, wherein the first sealing portion, the second sealing portion and the sealed reservoir space are formed along a continuous inner peripheral surface of the tubular wall of the tubular port.

* * * * *